(12) United States Patent
Heckt et al.

(10) Patent No.: US 7,556,091 B2
(45) Date of Patent: Jul. 7, 2009

(54) HEAT EXCHANGER ASSEMBLY

(75) Inventors: Roman Heckt, Aachen (DE); Dragi Antonijevic, Belgrade (RU)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 11/759,557

(22) Filed: Jun. 7, 2007

(65) Prior Publication Data

US 2007/0267186 A1 Nov. 22, 2007

Related U.S. Application Data

(63) Continuation-in-part of application No. 10/802,194, filed on Mar. 17, 2004, now abandoned.

(30) Foreign Application Priority Data

Mar. 17, 2003 (DE) ................................. 103 13 234

(51) Int. Cl.
- *B60H 1/00* (2006.01)
- *F28D 1/03* (2006.01)
- *F28D 1/04* (2006.01)
- *F28D 1/047* (2006.01)
- *F28D 1/053* (2006.01)

(52) U.S. Cl. ........................... 165/202; 165/42; 165/43; 165/140; 165/144; 165/152; 165/153; 165/176

(58) Field of Classification Search ................. 165/202, 165/42, 43, 140, 176, 141, 144, 152, 153; 237/2 B See application file for complete search history.

(56) References Cited

U.S. PATENT DOCUMENTS

| | | | |
|---|---|---|---|
| 1,798,330 A | * | 3/1931 | Leek ........................... 165/141 |
| 1,917,042 A | | 7/1933 | Thorton et al. |
| 2,298,895 A | * | 10/1942 | McKibben et al. .......... 165/176 |
| 2,617,634 A | | 11/1952 | Jendrassik |
| 3,045,979 A | * | 7/1962 | Huggins et al. ............. 165/152 |
| 4,081,025 A | | 3/1978 | Donaldson |
| 4,949,779 A | | 8/1990 | Kenny et al. |
| 4,976,309 A | | 12/1990 | Averin |
| 5,884,696 A | | 3/1999 | Loup |
| 6,095,239 A | * | 8/2000 | Makino et al. ............... 165/140 |
| 6,810,952 B2 | * | 11/2004 | Ben Fredj et al. ........... 165/140 |
| 2001/0001982 A1 | * | 5/2001 | Khelifa et al. ............... 165/140 |
| 2001/0035286 A1 | | 11/2001 | Kobayashi et al. |

FOREIGN PATENT DOCUMENTS

| | | | | |
|---|---|---|---|---|
| CA | | 610005 A | | 12/1960 |
| DE | | 198 55 309 C 2 | | 5/2002 |
| JP | | 61049992 A | | 3/1986 |
| JP | | 61202084 A | * | 9/1986 |
| JP | | 05272882 A | | 10/1993 |

* cited by examiner

Primary Examiner—John K Ford
(74) Attorney, Agent, or Firm—Brinks Hofer Gilson & Lione

(57) ABSTRACT

A heating heat exchanger in a coolant circuit for motor vehicles is provided whereby the air to be heated can be additionally heated by a refrigerant circuit, operable as heat pump or short circuit, for additional heating. A gas cooler/condenser for the additional heating operation and a functionally separated evaporator for the cooling plant operation of the refrigerant circuit are provided. The heat exchanger surfaces of the gas cooler/condenser for the additional heating operation are integrated into the heating heat exchanger and an additional heating operation the air to be heated is simultaneously heated by the heating heat exchanger and the gas cooler/condenser.

3 Claims, 4 Drawing Sheets

HEAT EXCHANGER ASSEMBLY

CROSS-REFERENCE TO RELATED APPLICATIONS

This application is a continuation-in-part of U.S. Non-Provisional application Ser. No. 10/802,194, filed on Mar. 17, 2004, now abandoned entitled "Heat Exchanger Assembly," the entire contents of which are incorporated herein by reference. This application also claims priority to German Patent Application DE 103 13 234.1, filed on Mar. 17, 2003, the entire contents of which are incorporated herein by reference.

BACKGROUND OF THE INVENTION

1. Field of the Invention

The invention relates to a heat exchanger in a coolant circuit of a motor vehicle and system to heat the passenger compartment.

2. Related Art

The trend towards highly efficient motor vehicle drive systems has resulted in a lack of sufficient waste heat for heating the interior of the vehicle. Therefore, the comfort conditions get worse in vehicles in which the passenger compartment is heated solely based on the engine's coolant circuit.

In the state-of-the-art there are many approaches to solve this problem. For example, the cooling circuit can be electrically heated or the air of the vehicle interior can be directly heated by means of PTC resistors. Additionally, fuel-fired supplemental heating devices for the coolant circuit are known.

An alternative development to supplemental heating devices is to use the refrigerant systems, or air conditioning units, present in motor vehicles for the heating of the vehicle interior. This is possible by operating the air conditioning unit as heat pump. Alternatively, a "short" circuit, without secondary heat absorption in the clockwise-rotating version or anti-clockwise-rotating version, can be used. In a short circuit, essential portions of the mechanical drive power of the compressor are transformed into heat for the purpose of heating the passenger compartment. Such air conditioning units are also known.

When an air conditioning unit in a vehicle is used for additional heating, a highly undesirable effect occurs under certain use and environmental conditions. Particularly, when the refrigerant system is used as a cooling plant, the evaporator arranged in the ventilating system of the vehicle will dehumidify the air to be cooled. After having stopped the engine and starting it anew when the heat exchanger has previously been used as evaporator and now is subsequently used as condenser or gas cooler in heating modes, due to heat being given off to the air flow, the humidity condensed on the evaporator surface will be introduced into the vehicle interior. Alternating use of the system as cooling plant and heat pump is quite frequent in the transitional weather periods, such as Spring and Autumn.

The high humidity air led into the vehicle interior results in condensation on the cold interior surfaces of the vehicle, particularly on the windows, with accompanying deterioration of the passengers' sight. This effect is also called flash-fogging.

In the state-of-the-art, solutions exist that are intended to prevent this effect.

After a special form of construction for the refrigerant carbon dioxide, in DE 198 55 309 an additional heating device for vehicles is disclosed. Here the gas cooler, or condenser, respectively, is divided into different regions, alternatingly used for cooling or heating. First, there is an evaporator region, which in cooling plant operation cools and, accordingly, dehumidifies the air flowing into the vehicle interior. Second, another region, in heat pump operation, heats the air flowing into the vehicle interior. This functional separation ensures that the air condensed on the evaporator will not, or only a little, be re-absorbed by the air flowing into the vehicle interior, thereby reducing possibility of flash fogging.

In DE 198 55 309, the heating heat exchanger is combined with the additional heating device from the refrigerant circuit for heating in such a way that the heat exchangers are switched in series. However, this results in the disadvantage that even more of the limited space available in the ventilation plants of motor vehicles is required by such a series connection.

Therefore, it is the objective of the invention to provide a heating heat exchanger, which requires little space and enables an advantageous control behavior and lowest possible flow resistance.

BRIEF SUMMARY OF THE INVENTION

According to the invention, the problem is solved by a heating heat exchanger in a coolant circuit for vehicles, whereby the air to be heated can be additionally heated by means of a refrigerant circuit operable as heat pump or short circuit to provide the additional heating. A gas cooler/condenser for the additional heating and a functionally separated evaporator for cooling plant operation of the refrigerant circuit are provided, whereby the heat exchanger surfaces of the gas cooler/condenser for additional heating operation are integrated into the heating heat exchanger and the air to be heated during additional heating operation is simultaneously heated by the heating heat exchanger and the gas cooler/condenser.

As used herein, additional heating operation means that operational mode, in which the refrigerant circuit, e.g. operating in a heat pump circuit or a short circuit, is used for additional heating of the vehicle's passenger compartment.

The combination of the invention is realized with particular advantage, when the refrigerant circuit and the coolant circuit in additional heating operation are controlled such that the heat exchanger surfaces of the heating heat exchanger and the gas cooler/condenser have differences in temperature of less than 25 K during the additional heating operation.

One aspect of the invention is in the separation of the functions of the heat exchangers in additional heating operation and the integration of the component for the heating of the air into the heating heat exchanger of the coolant circuit.

Advantages include, without limitation, the avoidance of the flash-fogging and the possibility to space-savingly realize functional separation in heat exchanger components of the refrigerant circuit.

The combined use of the heat exchanger surfaces of coolant circuit and refrigerant circuit in the heat exchanger enables the invention to obtain the functionality of additional heating by means of a switched-over refrigerant circuit without additional space demand in a ventilating plant and without the risk of flash fogging.

BRIEF DESCRIPTION OF THE DRAWINGS

Other details, features and advantages of the invention ensue from the following description of embodiment examples with reference to the accompanying drawings.

DETAILED DESCRIPTION OF THE INVENTION

Figure 1:
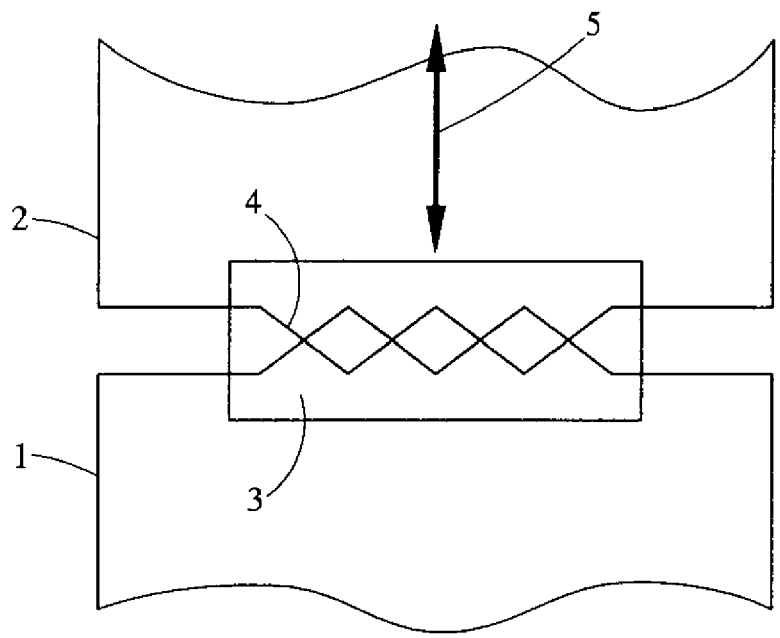
FIG. 1 is a schematic of the refrigerant and coolant circuit combination.

In FIG. 1 the concept of a refrigerant and coolant circuit combination is schematically illustrated. A heating heat exchanger 3 of coolant circuit 1 and gas cooler/condenser 4 of a refrigerant circuit 2 are combined such that the heat exchanger surfaces of the heating heat exchanger 3 and the gas cooler/condenser 4 are simultaneously passed by the air to be heated 5 in heat pump operation. The undesired mutual influence of the coolant and refrigerant circuits 1, 2 is minimized in that the circuits are controlled without significant power loss such that the temperature difference between the heat exchanger surfaces is less than 25 K.

Figure 2:
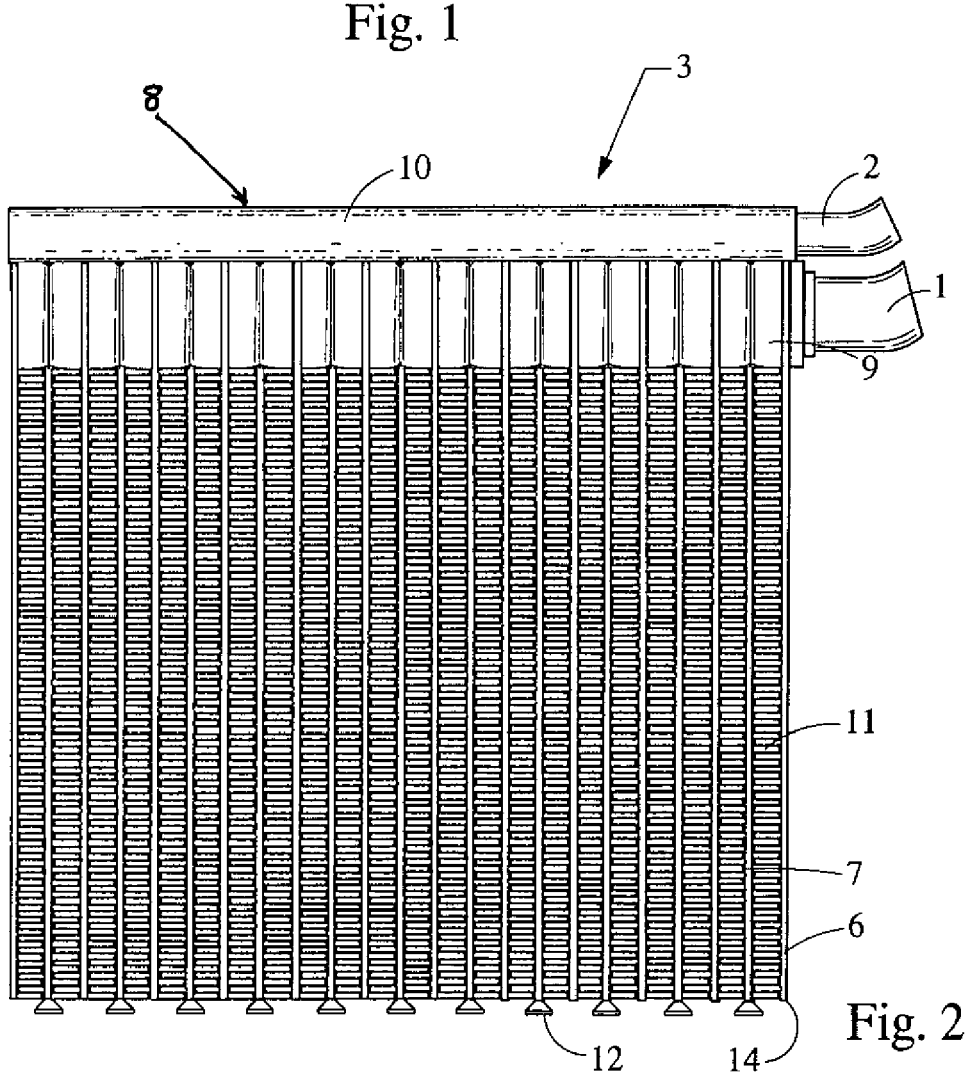
FIG. 2 is a heating heat exchanger with integrated gas cooler/condenser.

FIG. 2 shows a heating heat exchanger 3 with integrated gas cooler/condenser. The heating heat exchanger 3 includes coolant tubes 6 and refrigerant tubes 7 alternatingly arranged side by side, which are parallelly passed by the air to be heated. Between the coolant tubes 6 and refrigerant tubes 7 cellular blocks 11 are provided, which enlarge the heat exchanger surface. A head unit 8, having coolant and refrigerant portions 9 and 10, is placed at a head of the heating heat exchanger 3.

Turning to the examples of FIGS. 2-5, coolant of the coolant circuit 1, and in a similar manner refrigerant of the refrigerant circuit 2, are distributed by the head unit 8. The coolant in a coolant distributor region 9b of the coolant portion 9 is circulated into the coolant tubes 6, passes through the coolant tubes 6 and dissipates heat to the cellular blocks 11 in thermal contact with the coolant tubes 6, thereby heating the air to be heated 5. In a redirection region 14 of the coolant tubes 6 the coolant is redirected by 180° and flows in the opposite direction back to a coolant collector region 9a, where the coolant is collected and passed on to the coolant circuit. Refrigerant in a refrigerant distributor region 10b of the refrigerant portion 10 flows into refrigerant tubes 7 and through a similar 180° redirection in a helix-shaped redirection region 12 of the refrigerant tubes 7 before returning to the refrigerant collector region 10a.

Figure 3:
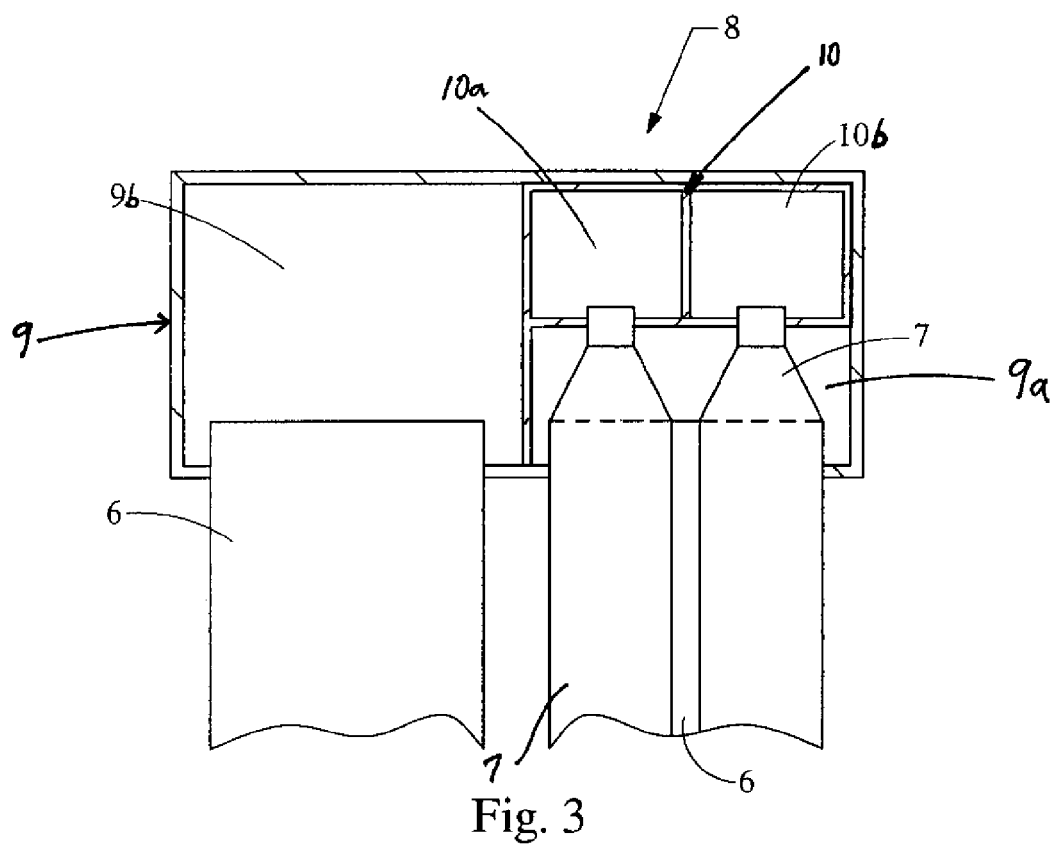
FIG. 3 is a unit having coolant and refrigerant portions.

In FIG. 3 one example of the head unit 8 of the heating heat exchanger 3 with the separate collector and distributor regions is shown in more detail. The head unit 8 includes the coolant portion 9 and the refrigerant portion 10 with the refrigerant collector portion 10 partly surrounded by the coolant portion 9. The coolant tubes 6, configured as flat tubes, are attached to the coolant portion 9 of the unit 8. The refrigerant tubes 7, configured as flat tubes with channels for the refrigerant, penetrate a wall of the coolant portion 9 into the coolant collector region 9a and are attached to the refrigerant portion 10, which is separate from the coolant portion 9, within the unit 8. According to the shown preferred embodiment of the invention, two layers of coolant tubes 6 and refrigerant tubes 7 are provided in each case, and the refrigerant tubes 7 are arranged wholly within one layer of the coolant tubes 6.

Figure 4:
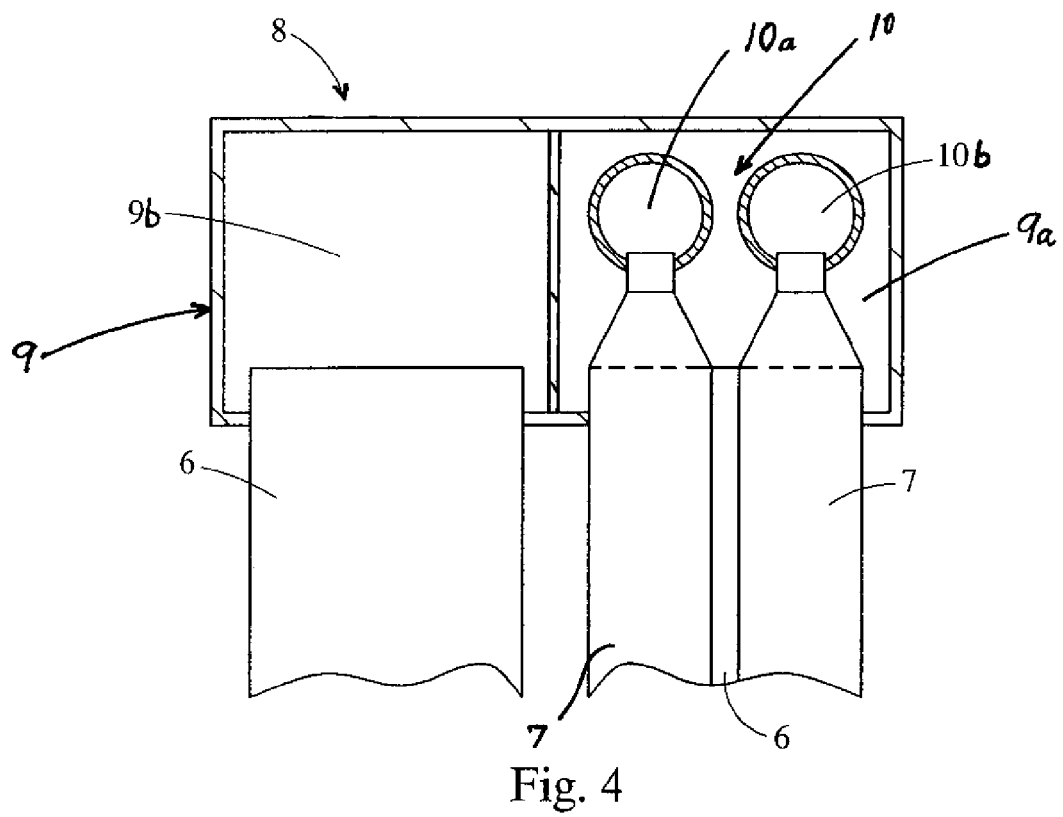
FIG. 4 is a unit with an integrated refrigerant portion.
Figure 5:
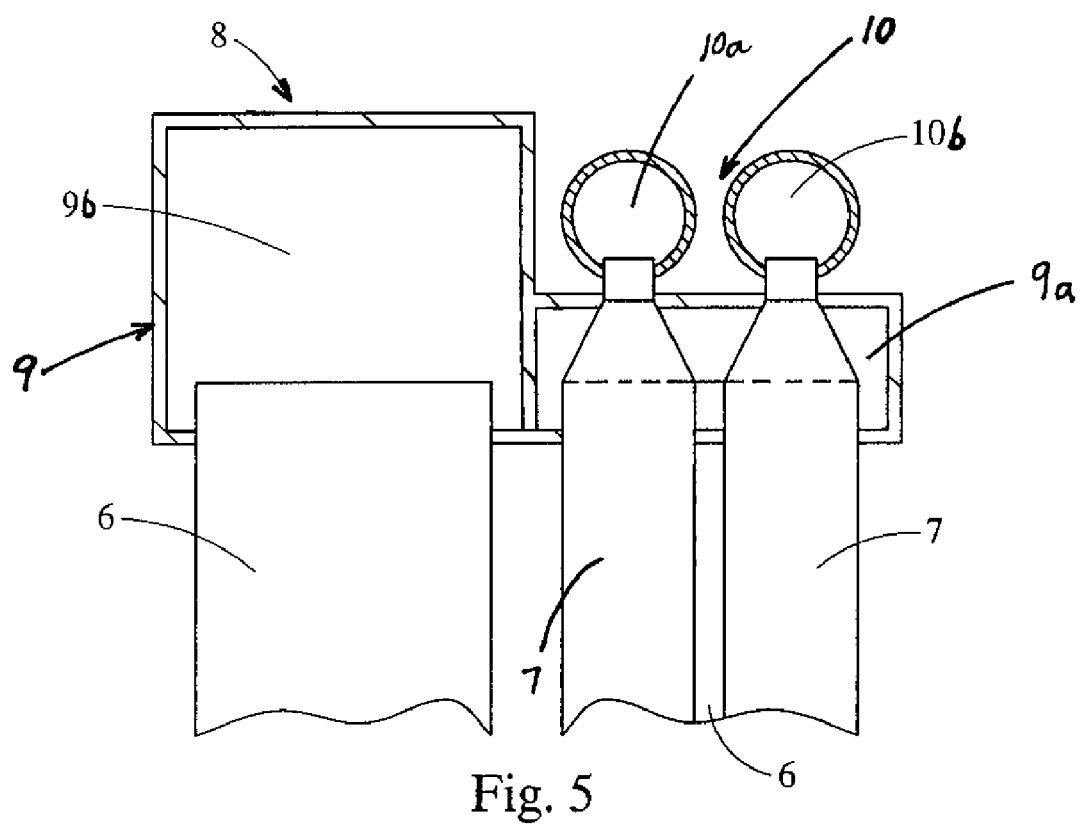
FIG. 5 is a unit with an externally arranged refrigerant portion.

The FIGS. 4 and 5 represent different embodiments of the design of the unit 8. In FIG. 4 a unit 8 with refrigerant portion 10 integrated into the coolant collector region 9a of the coolant portion 9 is shown. In FIG. 5, an embodiment of a unit 8 is shown with the refrigerant portion 10 arranged outside of the coolant portion 9.

From the above, a concept is realized, in which the refrigerant portion 10 has no common boundary surface with the coolant portion 9. Hence, the refrigerant portion 10 is thermally separated from the coolant portion 9 since it is located outside of the coolant portion 9. Thus, undesirable heat flow from the coolant circuit 1 to the refrigerant circuit 2 and vice versa is prevented. In the shown embodiment of the invention, the refrigerant tubes 7 penetrate the coolant portion 9. An advantageous modification of the invention consists in the refrigerant tubes 7 being installed in a wider arc around the coolant portion 9 and therefore no direct thermal contact through heat conduction to the coolant portion 9 exists.

Figure 6:
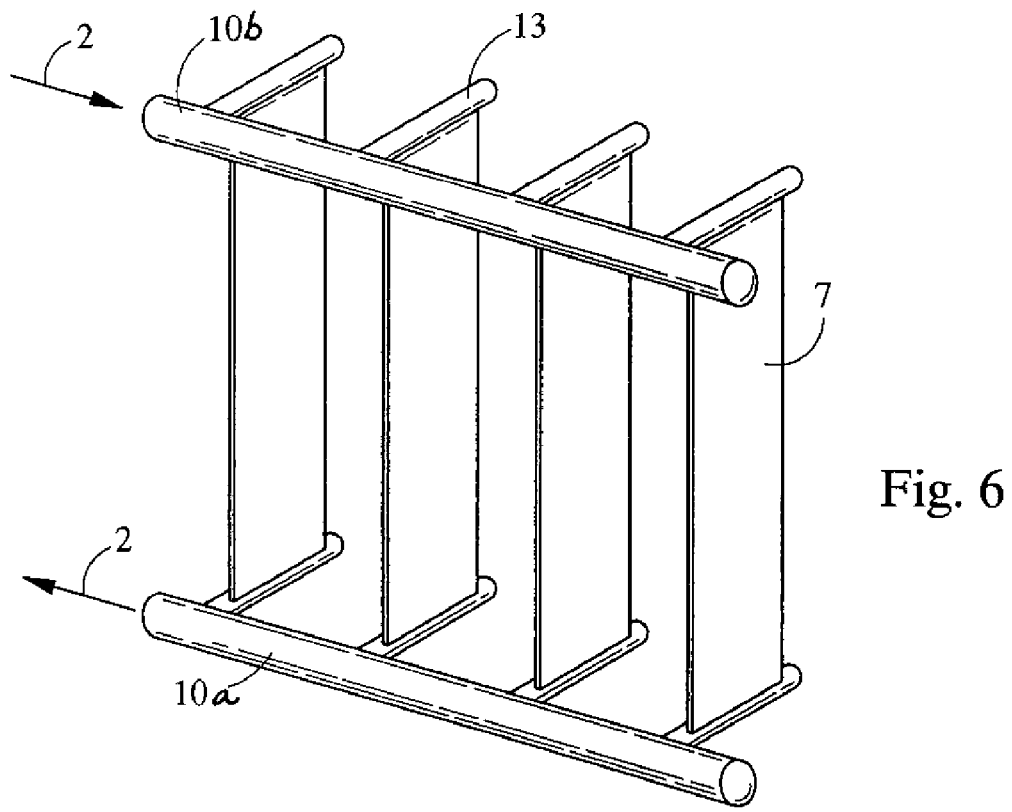
FIG. 6 is a gas cooler/condenser-heat exchanger component in comb design.

In FIG. 6 another advantageous embodiment, characterized by a comb design, is shown. The heating heat exchanger 3 is configured as usual in the state-of-the-art modified in that some coolant tubes 6 are omitted to make space for refrigerant tubes 7. The refrigerant collector and distributor regions 10a and 10b are connected to the refrigerant tube 7 over connection tubes 13. Due to the fact that the refrigerant collector and distributor regions 10a and 10b are arranged outside of the coolant portion 9, the resulting comb design realizes a good thermal separation of the coolant circuit 1 from the refrigerant circuit 2.

Figure 7:
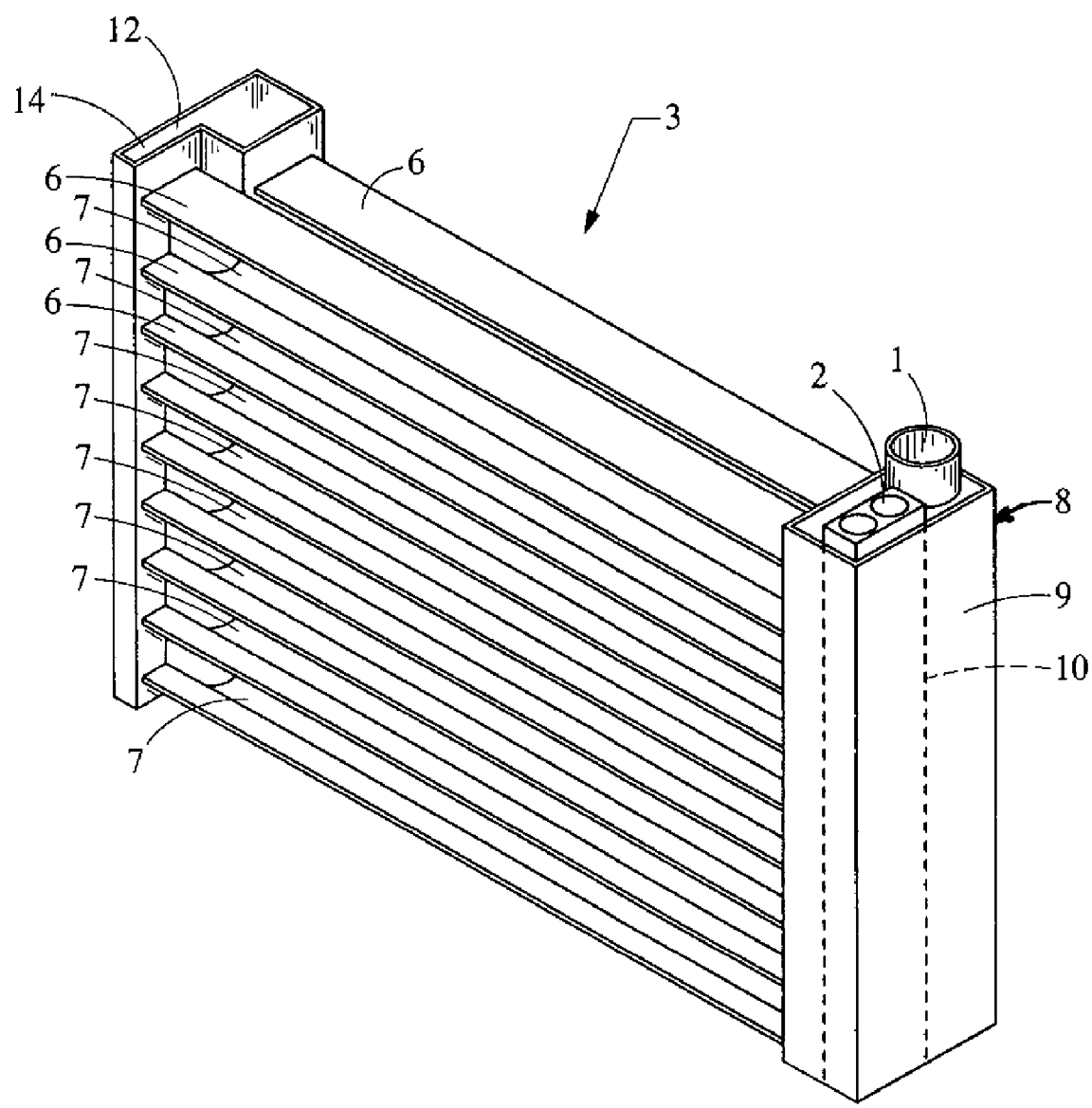
FIG. 7 is a heating heat exchanger with integrated gas cooler/condenser in three-dimensional view.

According to FIG. 7 a three-dimensional view of another advantageous embodiment is proposed and in which the combination of different geometries of refrigerant and coolant tubes 7, 6 is elucidated. Two layers, or rows, of coolant tubes 6 are arranged after each other in direction of the passing air. Within one layer of coolant tubes 6, alternating refrigerant tubes 7 are arranged, whereby the refrigerant tubes 7 again are arranged in two layers after each other in direction of the passing air.

The heat exchanger unit of the refrigerant, which is integrated into one row of the coolant heat exchanger, can be placed on the air inflow side or air outflow side depending on the chosen configuration of additional heating by the refrigerant circuit.

Further, concerning the arrangement and type of coolant circuits, known in the state-of-the-art for cross flow, cross countercurrent flow and cross co-current flow as well as parallel flow and co-current flow can be used advantageously depending on the thermal states and space conditions.

The invention claimed is:

1. A heat exchanger assembly for motor vehicles, whereby air to be heated can be additionally heated by a refrigerant circuit operable as a heat pump or short circuit to provide additional heating, said assembly comprising:

a heating heat exchanger having a plurality of coolant tubes connected to a head unit including a coolant collector region and a coolant distributor region in a coolant circuit wherein the plurality of coolant tubes are configured to distribute coolant from the coolant distributor region and return coolant to the coolant collector region, the coolant tubes also having a heat exchanging surface for exchanging heat between a fluid circulating in the coolant circuit and the air to be heated; and a gas condenser having a plurality of refrigerant tubes connected to the head unit, the head unit including a refrigerant collector region and a refrigerant distributor region in a refrigerant circuit wherein the plurality of refrigerant tubes are configured to distribute refrigerant from the refrigerant distributor region and return refrigerant to the refrigerant collector region, the refrigerant tubes also having a heat exchanging surface for exchanging heat between a refrigerant circulating in the refrigerant circuit and the air to be heated, and wherein the refrigerant collector region is at least partly surrounded by the coolant collector region, and wherein some of the plurality of coolant tubes are arranged in a first row and wherein others of the plurality of coolant tubes are arranged with the plurality of refrigerant tubes in a second row, the plurality of refrigerant tubes being located only in the second row and being arranged after the plurality of coolant tubes in the first row in a direction of the passing air to be heated.

2. The assembly of claim 1 wherein said coolant tubes and said refrigerant tubes are arranged next to each other and are parallely passed by air.

3. A heat exchanger assembly for motor vehicles, whereby air to be heated can be additionally heated by a refrigerant circuit operable as a heat pump or short circuit to provide additional heating, said assembly comprising:

a heating heat exchanger having a plurality of coolant tubes connected to a head unit including a coolant collector region and a coolant distributor region in a coolant circuit wherein the plurality of coolant tubes are configured to distribute coolant from the coolant distributor region and return coolant to the coolant collector region, the coolant tubes also having a heat exchanging surface for exchanging heat between a fluid circulating in the coolant circuit and the air to be heated; and a gas condenser having a plurality of refrigerant tubes connected to the head unit, the head unit including a refrigerant collector region and a refrigerant distributor region in a refrigerant circuit wherein the plurality of refrigerant tubes are configured to distribute refrigerant from the refrigerant distributor region and return refrigerant to the refrigerant collector region, the refrigerant tubes also having a heat exchanging surface for exchanging heat between a refrigerant circulating in the refrigerant circuit and the air to be heated, and wherein the refrigerant collector region is at least partly surrounded by the coolant collector region, and wherein some of the plurality of coolant tubes are arranged in a first row and wherein others of the plurality of coolant tubes are arranged with the plurality of refrigerant tubes in a second row, said coolant tubes and said refrigerant tubes in said second row being arranged alternating next to each other, the plurality of refrigerant tubes being located only in the second row and being arranged after the plurality of coolant tubes in the first row in a direction of the passing air to be heated and being parallely passed by air.

* * * * *

UNITED STATES PATENT AND TRADEMARK OFFICE
CERTIFICATE OF CORRECTION

| | | |
|---|---|---|
| PATENT NO. | : 7,556,091 B2 | Page 1 of 1 |
| APPLICATION NO. | : 11/759557 | |
| DATED | : July 7, 2009 | |
| INVENTOR(S) | : Roman Heckt et al. | |

It is certified that error appears in the above-identified patent and that said Letters Patent is hereby corrected as shown below:

On the Title Page

Item (75), after "Belgrade" replace "(RU)" with --(YU)--.

Signed and Sealed this

Twenty-seventh Day of October, 2009

David J. Kappos
*Director of the United States Patent and Trademark Office*